United States Patent Office 3,534,099
Patented Oct. 13, 1970

3,534,099
PROCESS FOR MAKING N-SUBSTITUTED AND N,N-SUBSTITUTED CARBOXYLIC ACID AMIDES
Jane P. Cookson, Marshall Township, Allegheny County, and Joseph S. Matthews, O'Hara Township, Allegheny County, Pa., assignors to Gulf Research & Development Company, Pittsburgh, Pa., a corporation of Delaware
No Drawing. Filed May 25, 1967, Ser. No. 641,114
Int. Cl. C07c *103/30*
U.S. Cl. 260—561        8 Claims

ABSTRACT OF THE DISCLOSURE

A process for making N-substituted and N,N-substituted carboxylic acid amides by the reaction of a carboxylic acid amide, ammonia and an organic halide at an elevated temperature.

---

This invention relates to a novel process for making N-substituted carboxylic acid amides and N,N-substituted carboxylic acid amides by the reaction of a carboxylic acid amide, ammonia and an organic halide at an elevated temperature.

The N-substituted carboxylic acid amides and N,N-substituted carboxylic acid amides are readily converted to the corresponding primary and secondary amines by hydrolysis. We have discovered a process for producing the N- and N,N-substituted carboxylic acid amides by reacting an organic halide, ammonia and a carboxylic acid amide at elevated temperatures. This reaction is relatively rapid and proceeds substantially to completion. Hydrolysis of the substituted amide will then produce the corresponding amine in excellent yields and purity. It is known that the reaction of an organic halide with ammonia will produce a mixture of primary, secondary, tertiary and quaternary amines. However, this mixture is difficult to separate into the individual amines making the reaction less than desirable as a method for producing amines.

It is preferred for convenience in operation that the carboxylic acid amide be a liquid at reaction conditions. If the carboxylic acid amide is an unsubstituted amide then either the N-substituted or N,N-substituted amide or mixtures may be produced by this reaction. However, if an N-substituted carboxylic acid amide is the reactant, then the only product that is possible is the N,N-substituted amide. This affords a very simple and convenient means for preparing secondary amines of different organic radicals. For example, formamide, ammonia and 1-chloroeicosane may be reacted hereunder to produce N-eicosyl formamide and this can be reacted with 1-bromobutane to produce N-butyl, N-eicosyl formamide. This compound may then be hydrolyzed with water to produce butyleicosylamine. Examples of carboxylic acid amides that are useful hereunder include formamide, acetamide, propionamide, n-butyramide, isobutyramide, stearamide, benzamide, nicotinamide, ethyl carbamate, carbamide, N-methyl formamide, N-ethyl formamide, N-methyl acetamide, N-ethyl acetamide, acetanilide, acetophenetidine, benzanilide, etc. We prefer unsubstituted carboxylic acid amides having from one to 20 carbon atoms.

The organic halides are selected from the group consisting of primary straight and branched chain alkyl halides, secondary straight and branched chain alkyl halides, primary and secondary cyclic halides, and straight and branched chain olefinic halides. These organic halides include both mono-, di-, and polyhalides. These include the primary straight and branched chain alkyl halides having from one to 30 carbon atoms, preferably from four to 20 carbon atoms, more preferably from eight to 16 carbon atoms, and the secondary straight and branched chain alkyl halides having from one to 30 carbon atoms, preferably from four to 20 carbon atoms, more preferably from eight to 16 carbon atoms. Examples of these compounds are chloromethane, bromomethane, iodomethane, 1-chlorobutane, 1-bromobutane, 1-iodobutane, 1-chloro-2-methyl propane, 1-chloro-4-bromobutane, 1,5-dichloro-3,3-dimethyl pentane, 1-chlorooctane, 2-chlorooctane, 3-chlorooctane, 4-chlorooctane, 1-bromooctane, 2-iodooctane, 1-chlorononane, 1-bromononane, 3-iodononane, 1-chlorodecane, 1-bromodecane, 1-chloroundecane, 1-chlorododecane, 1-bromododecane, 1-iodododecane, 4-chlorododecane, 1-bromotridecane, 1-chlorotetradecane, 1-bromotetradecane, 1-iodotetradecane, 5-bromotetradecane, 1-chloropentadecane, 1-chlorohexadecane, 1-bromohexadecane, 1-iodohexadecane, 7-bromohexadecane, 1-bromoheptadecane, 1-chlorooctadecane, 1-bromooctadecane, 1-iodooctadecane, 5-iodooctadecane, 1-iodononadecane, 1-chloroeicosane, 1-bromoeicosane, 1-iodoeicosane, 8-chloroeicosane, 1-bromopentacosane, 1-chlorotriacontane, 1-bromotriacontane, 1-iodotriacontane, 6-bromotriacontane, etc.

Suitable organic halides of the group specified above also include primary cyclic halides having from four to 22 carbon atoms, preferably from four to 12 carbon atoms, and secondary cyclic halides having from three to 22 carbon atoms, preferably from three to 12 carbon atoms. Examples of these compounds include chlorocyclopropane, bromocyclopropane, chlorocyclopentane, chlorocyclopentylmethane, bromocyclopentane, bromocyclopentylmethane, iodocyclopentane, chlorocyclohexane, bromocyclohexane, chlorocyclohexylmethane, bromocyclohexylmethane, iodocyclohexane, 1-iodo-1-cyclohexylmethane, 1-chlorocycloheptane, 1-bromocycloheptane, 1-iodocycloheptane, 1 - chlorocyclooctane, 1-bromocyclooctane, 1-iodocyclononane, 1 - chlorocyclononane, 1-bromocyclodecane, 1-iodocycloundecane, 1-chlorocyclododecane, etc.

The suitable organic halides of the group specified above also include primary straight and branched chain olefinic halides having from three to 20 carbon atoms, preferably from six to 20 carbon atoms, and secondary straigth and branched chain olefinic halides having from three to 20 carbon atoms, preferably from six to 20 carbon atoms except those in which the halogen is attached to a carbon atom forming the double bond. Examples of these compounds include allyl chloride, allyl bromide, allyl iodide, 4-bromobutene-1, 5-chloropentene-1, 6-bromohexene-1, 7-iodoheptene-1, 1-bromohexene-2, 1-chloroheptene-3, 1-bromooctene-4, 3-chlorobutene-1, 4-bromopentene-1, 5-chlorohexene-1, 1-chlorododecene-2, 1-bromohexadecane-2, 1-iodoeicosene-2, 3-iodooctene-1, 3-bromodecene-1, 3-iodododecene-1, 3-chlorohexadecene-1, 3-bromoeicosene-1, 19-chloroeicosene-1, etc.

The organic halides defined above need not be employed as such, but one or more of the hydrogens thereon can be replaced by such diverse radicals as dialkylamino, alkoxy, alkylmercapto, alkyl, phenyl, benzyl, naphthyl, cycloalkyl, xylylenyl, etc. Examples of such organic halides are benzyl chloride, benzyl bromide, benzyl iodide, β-chloroethylbenzene, β-bromoethylbenzene, β-iodoethylbenzene, 1-chloro-3-phenylpropane, 1-bromo-4-phenylbutane, 1-iodo-5-phenylpentane, α-chloroxylene, α-bromoxylene, α - iodoxylene, 1 - chloro-6-methoxyhexane, 1-bromo-8-mercaptooctane, 1-chloro-2-benzylpropane, 1-chloro - 3-phenylpropane, 1-bromo-4-naphthylbutane, 1-bromo - 3-cyclopropylpropane, 1-chloro-5-cyclohexylpentane, 1,4-di-(omega-chloroethyl)benzene, etc.

Examples of polyhalides usable herein include methylene dichloride, ethylene dibromide, 1,6-dibromohexane, 2,11 - dichlorododecene, 1,5,16,20-tetrabromoeicosene, 1,1,1,5-tetrachloropentane, p-xylenyl dichloride, 1,3-dibromo-2-phenyl propane, etc.

Of these organic halides we prefer to employ the mono- and di-haloalkanes and of these particularly the chlorides and bromides.

The following equations are intended to show the stoichiometry of the desired reactions:

$$RCl + NH_3 + R'CONH_2 \rightarrow R'CONHR + NH_4Cl \quad (1)$$
$$2RCl + 2NH_3 + R'CONH_2 \rightarrow R'CONR_2 + 2NH_4Cl \quad (2)$$
$$R''Cl + NH_3 + R'CONHR \rightarrow R'CONRR'' + NH_4Cl \quad (3)$$
$$RCl_2 + 2NH_3 + 2R'CONH_2 \rightarrow (R'CONH)_2R + 2NH_4Cl \quad (4)$$

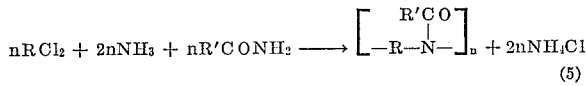

(5)

$$RCl_2 + 2NH_3 + 2R'CONHR'' \rightarrow$$
$$(R'CONR'')_2R + 2NH_4Cl \quad (6)$$

In these equations R and R'' represent an organic radical as defined under organic halides above and R' represents an organic group as defined under carboxylic acid amides above.

In Equation 1 it is noted that the N-substituted amide is produced by the reaction of equi-molar proportions of the organic halide and carboxylic acid amide. In order to direct the reaction to the N-substituted amide it is desired to use an excess of the carboxylic acid amide such as at least about a 5:1 excess and more preferably from about 10:1 to about 50:1 excess. From Equation 2 the stoichiometry for producing the N,N-substituted amide requires two mols of organic halide for each mol of carboxylic acid amide. In order to direct the reaction to the N,N-substituted carboxylic acid amide it is preferred to use a ratio of organic halide to carboxylic acid amide greater than 2:1 preferably from about 2:1 to about 10:1. However, in this instance it is noted that the N,N-substituted amide is produced by reaction of any N-substituted carboxylic acid amide with organic halide according to Equation 3.

In carrying out the reaction it is desirable to operate at a temperature at which the carboxylic acid amides are liquids as well as a temperature at which the reaction is sufficiently rapid. For these reasons we prefer to carry out the reaction at a temperature of at least about 100° C. We find that the maximum temperature need not go above about 300° C. and should not exceed the decomposition temperature of any of the reactants, such as formamide which begins to decompose at about 220° C. Our most preferred temperature range is from about 130° C. to about 220° C.

The pressure under which the reaction takes places is not critical. If the reaction is carried out under conditions of reflux, approximately atmospheric pressure is involved. On the other hand when the reaction is carried out in a closed reactor we prefer to operate with the autogenous pressure developed within the reactor vessel. Additionally, it is possible to carry out the reaction in a reactor pressurized with an inert gas such as nitrogen. The reaction will take place at pressures ranging from atmospheric pressure to about 100 atmospheres or higher.

The amount of ammonia is not critical provided that at least one mol of ammonia is present for each equivalent of halide. Preferably an excess of from about 2 to 10 mols of ammonia for each equivalent of halide is used. The reaction medium may be either anhydrous or hydrous; therefore, ammonium hydroxide may be used as the reactant. Since water in excess does not provide any particular benefit, it is preferred that it does not significantly exceed a 1:1 molar ratio with respect to the ammonia.

Specific examples of the process of the invention will now be described.

A mixture of 8.5 g. (0.5 mol) anhydrous ammonia dissolved in 226 g. (5 mol) formamide was introduced into a one liter stirred autoclave containing 48.7 g. (0.25 mol) n-octyl bromide and 9.4 g. (0.5 mol) water at 145° to 155° C. After 3.5 hours the reaction mixture was cooled and purged with nitrogen to remove excess ammonia. Two phases separated out and the products were analyzed. The n-octyl bromide was completely reacted, 85 percent going to N-octyl formamide, 5 to 10 percent going to N,N-dioctyl formamide, and the remainder to a mixture of n-octyl alcohol and n-octyl formate. The corresponding amine, n-octyl amine, is produced quantitatively from N-octyl formamide by reacting with water in a mild sodium hydroxide solution at about 100° C.

The following experiment illustrates an anhydrous reaction. A mixture of 0.125 mol of n-octyl bromide and 0.47 mol of anhydrous ammonia were dissolved in 2.5 mols of formamide in an autoclave and heated with stirring at 150° C. for 1.5 hours. At this time 97.6 percent of the bromide had been converted, 91 percent going to N-octyl formamide, 2.7 percent to N,N-dioctyl formamide and 6.3 percent to n-octyl alcohol.

In like manner one mol of 1,6-dichlorohexane reacts with two mols of acetamide present in substantial excess according to Equation 4 to produce 1,6-di-N-acetamide hexane. This hydrolyzes to 1,6-diaminohexane upon heating with a catalyst such as a dilute sodium hydroxide solution. When the proportion of the dihalo compound is reduced, equi-molar amounts of the dihalo compound and amide polymerize according to Equation 5. For example 1,6-dibromohexane polymerizes with formamide to produce a material having the general formula

while 2,5-dibromohexane polymerizes with formamide to produce a material having the general formula

In like manner p-xylenyl dichloride produces a material having the general formula

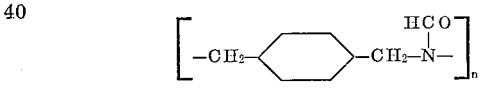

while methylene dichloride produces a material of the general formula

In these polymerization reactions a quantity of an N-substituted amide in the reaction mixture will terminate the polymerization in accordance with the reaction indicated in Equation 6.

Additional examples of substituted amides which are made by the methods described herein include N-methylacetamide from methyl chloride and acetamide, N,N-dibutylbutyramide from butyl bromide and butyramide, N-hexyldecamide from hexyl iodide and decamide, N,N-dioctyl acetamide from octyl chloride and acetamide, N-dodecyldodecamide from dodecyl bromide and dodecamide, N-hexadecylformamide from hexadecyl bromide and formamide, N,N-dimethyleicosamide from methyl chloride and eicosamide, N-eicosylformamide from eicosyl iodide and formamide, N-cyclohexylformamide from cyclohexyl bromide and formamide, N-benzylacetamide from benzyl chloride and acetamide, N,N-methylbutylbutyramide from methyl chloride and butyl butyramide, N,N-diallyl acetamide from allyl bromide and acetamide, etc.

It is to be understood that the above disclosure is by way of specific example and that numerous modifications and variations are available to those of ordinary skill in the art without departing from the true spirit and scope of our invention.

We claim:

1. A process for preparing an N-substituted carboxylic acid amide, an N,N-substituted carboxylic acid amide or mixtures thereof which comprises heating a mixture of an unsubstituted carboxylic acid amide of from one to 20 carbon atoms, an organic halide selected from the group consisting of primary alkyl halides of from one to 30 carbon atoms, secondary alkyl halides of from one to 30 carbon atoms, primary cyclic halides of from four to 12 carbon atoms, secondary cyclic halides of from three to 12 carbon atoms, olefinic halides of from three to 20 carbon atoms, and substituted derivatives thereof within the specified ranges of carbon atoms in which one or more of the hydrogen atoms thereon is replaced by a group selected from dialkylamino, alkoxy, alkylmercapto, alkyl, phenyl, benzyl, naphthyl, cycloalkyl and xylylenyl, and at least one mol of ammonia for each equivalent of halide for reaction to ammonium halide at a temperature from about 100° to about 300° C.

2. A process for making an N-substituted carboxylic acid amide in accordance with claim 1 in which the molar ratio of carboxylic acid amide to organic halide is greater than one.

3. A process for making an N,N-substituted carboxylic acid amide in accordance with claim 1 in which the molar ratio of carboxylic acid amide to organic halide is less than 0.5.

4. A process in accordance with claim 1 in which the organic halide is selected from mono- and dichloro- and mono- and dibromo-alkanes having from one to 20 carbon atoms and the carboxylic acid amide has from one to 20 carbon atoms.

5. A process in accordance with claim 4 in which the carboxylic acid amide is selected from formamide and acetamide and the temperature is from about 130° to about 220° C.

6. A process in accordance with claim 5 in which the alkyl halide is octyl bromide.

7. A process in accordance with claim 4 in which the alkyl halide is selected from 1,6-dibromohexane and 1,6-dichlorohexane.

8. A process for preparing an N,N-substituted carboxylic acid amide which comprises heating a mixture of an N-substituted carboxylic acid amide of from one to 20 carbon atoms, an organic halide selected from the group consisting of primary alkyl halides of from one to 30 carbon atoms, secondary alkyl halides of from one to 30 carbon atoms, primary cyclic halides of from four to 12 carbon atoms, secondary cyclic halides of from three to 12 carbon atoms, and olefinic halides of from three to 20 carbon atoms, and substituted derivatives thereof within the specified ranges of carbon atoms in which one or more of the hydrogen atoms thereon is replaced by a group selected from dialkylamino, alkoxy, alkylmercapto, alkyl, phenyl, benzyl, naphthyl, cycloalkyl and xylylenyl, and at least one mol of ammonia for each equivalent of halide for reaction to ammonium halide at a temperature from about 100° to about 300° C.

References Cited

Galat et al.: J. Amer. Chem. Soc., vol. 65, pp. 1566–67 (1943).

Wagner et al.: Synthetic Organic Chemistry (1953), pp. 665–666.

ALEX MAZEL, Primary Examiner

J. A. NARCAVAGE, Assistant Examiner

U.S. Cl. X.R.

260—296, 404, 558, 561